US006192284B1

(12) United States Patent
Golden (10) Patent No.: US 6,192,284 B1
(45) Date of Patent: *Feb. 20, 2001

(54) CLAMPING ARM POSITION SENSING APPARATUS

(75) Inventor: Michael J. Golden, Sterling Heights, MI (US)

(73) Assignee: Norgren Automotive, Inc., Mt. Clemens, MI (US)

(*) Notice: Under 35 U.S.C. 154(b), the term of this patent shall be extended for 0 days.

This patent is subject to a terminal disclaimer.

(21) Appl. No.: 09/080,272

(22) Filed: May 15, 1998

(51) Int. Cl.$^7$ .................................................... G05B 19/18
(52) U.S. Cl. ........................... 700/56; 700/150; 700/175; 700/159
(58) Field of Search .............................. 700/56, 150, 175, 700/159; 702/150

(56) References Cited

U.S. PATENT DOCUMENTS

| 3,812,351 | * | 5/1974 | Coberley .................... 250/231 SE |
| 4,021,027 |   | 5/1977 | Blatt ................................. 269/32 |
| 4,599,601 |   | 7/1986 | Rammelsberg ..................... 340/347 |
| 4,664,364 |   | 5/1987 | Lymburner ............................. 269/32 |
| 4,817,007 | * | 3/1989 | New ................................. 364/474.01 |
| 5,139,246 |   | 8/1992 | Yakou ................................. 269/329 |
| 5,152,568 |   | 10/1992 | Blatt ..................................... 294/88 |
| 5,293,157 |   | 3/1994 | Yakou ................................. 340/674 |
| 5,330,168 |   | 7/1994 | Enomoto et al. ................... 269/329 |
| 5,415,383 |   | 5/1995 | Ausilio ............................... 269/238 |
| 5,694,042 | * | 12/1997 | Eaton et al. ..................... 324/207.22 |
| 5,845,897 |   | 12/1998 | Tunkers ................................. 269/32 |
| 5,875,417 | * | 2/1999 | Golden ................................ 702/150 |
| 5,984,501 | * | 11/1999 | Tomotaki et al. ............... 364/167.02 |

* cited by examiner

Primary Examiner—Robert W. Beausoliel, Jr.
Assistant Examiner—Robert G. Crockett
(74) Attorney, Agent, or Firm—Young & Basile, P.C.

(57) ABSTRACT

A sensor detects the absolute angular position of a rotatable clamp arm between full opened and full closed positions. The sensor is coupled to a clamp arm pivot shaft to provide output signals corresponding to the absolute position of the clamp arm. One or more programmable angular position set points are setable at angular positions in advance of the full open and full closed positions of the clamp arm. Outputs are generated when the clamp arm reaches and/or exceeds each set point.

18 Claims, 9 Drawing Sheets

CLAMPING ARM POSITION SENSING APPARATUS

BACKGROUND OF THE INVENTION

1. Field of the Invention

The present invention relates, in general, to clamps and, specifically, to clamps having a pivotal arm.

2. Description of the Art

Clamps are used in industrial applications to hold workpieces together at predetermined locations under force during work operations, such as machining, welding, etc. A typical fluid pressure actuated clamp utilizes a fluid-pressure actuated cylinder-piston fluid motor having a piston slidable within the cylinder housing by pressurized fluid. Movement of the piston extends and retracts a piston rod having an end extending outward from one end of the cylinder. The end of the piston rod is connected to a linkage to rotate a shaft carrying at least one pivotal clamp arm upon bi-directional rotation extension and retraction of the piston rod from a first open position to a second, workpiece engaging, closed position.

In high speed manufacturing production operations, it is necessary to know when the clamp arm is opened and/or closed before the next operation can be initiated. Electromechanical limit switches have been mounted at either or both of the open and closed positions of the clamp arm and mechanically engaged by the clamp arm to detect the open or closed position of the arm. Such switches are prone to breakage, misalignment, wear, etc.

Proximity switches have also been mounted at opposite ends of the fluid cylinder used to pivot the clamp arm to detect the piston position within the cylinder. Proximity switches thereby provide an indirect indication of the rotational position of the clamp arm by detecting whether the piston or piston rod is in the extended or retracted position equivalent to a closed or open position of the clamp arm.

However, the use of cylinder-operated proximity switches provides only an indirect indication of the position of the clamp arm. Damage to the clamp arm may render the clamp totally ineffective at clamping a workpiece; while the proximity switches still provide the indication of open or closed clamp arm position. In addition, if a workpiece is missing, misshaped or bent, the fluid cylinder will drive the clamp arm to the same closed position and the proximity switches will provide an indication of a fully closed clamp arm position. If the workpiece is out of position, the clamp arm which is moving under pressurized fluid force may encounter and deform a workpiece.

More importantly, the proximity switches, limit switches, etc., used to directly or indirectly detect the position of a clamp arm during movement between opened and closed positions do so only at the full open and full closed positions. In certain high speed assembly operations, this may delay the initiation of the next operation until the clamp arm reaches the fully opened or fully closed position; where the next initiating actions could actually have been started just prior to the movement of the clamp arm to the full open or full closed positions.

Thus, it would be desirable to provide a clamp arm position detector which determines the absolute position of a clamp arm during movement of the clamp arm between open and closed positions. It would also be desirable to provide a clamp arm position detector which is mountable on a standard clamp without significant modifications necessary to the clamp. It would also be desirable to provide a clamp arm position detector which is usable in left hand and right hand clamp applications without significant modification to the clamp. It would also be desirable to provide a clamp arm position detector which provides set points prior to full open and full closed clamp arm positions to be used to initiate the start of the next operation. It would also be desirable to provide a clamp arm position detector providing such set point wherein the set points are programmable over a set angular range of rotation of the clamp arm.

SUMMARY OF THE INVENTION

The present invention is a clamp arm position detector for a clamp having a pivotal clamp arm fixedly mounted on a rotatable shaft which is rotated via an external power source between first and second angular positions.

In a preferred embodiment, the clamp arm position detector includes means for detecting the absolute position of the clamp arm during movement of the clamp arm between first and second full travel positions. The detector means generates an output corresponding to the absolute position of the clamp arm.

Means are also provided for establishing a set point corresponding to one angular position of the clamp arm between the first and second full opened and full closed positions. Preferably, the set point is at an angular position different from either of the first or second fully opened and fully closed positions. Preferably, two set points are established, one prior to the clamp arm reaching the second full closed position and a second prior to the clamp arm reaching the first full opened position.

The means for establishing the set point(s) also includes means for changeably programming the set point(s) at any desired angular position.

In a preferred embodiment, the clamp arm position detector is coupled to a rotatable shaft link physically carrying one end of the clamp arm.

The clamp arm position detector of the present invention overcomes several deficiencies found in previously devised clamp arm position detectors typically used with fluid power-actuated clamps. Most significantly, the present detector determines the absolute position of the clamp arm thereby providing greater accuracy as compared to the indirect indication of clamp arm position via piston-cylinder mounted proximity switches. The detector is mountable on a standard clamp without significant modifications to the clamp. The position detector is also easily usable in left-hand and right-hand applications without modification to the clamp. The set points may be set at any desired angular position and may be easily readjusted as required by the needs of a particular application.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 1:
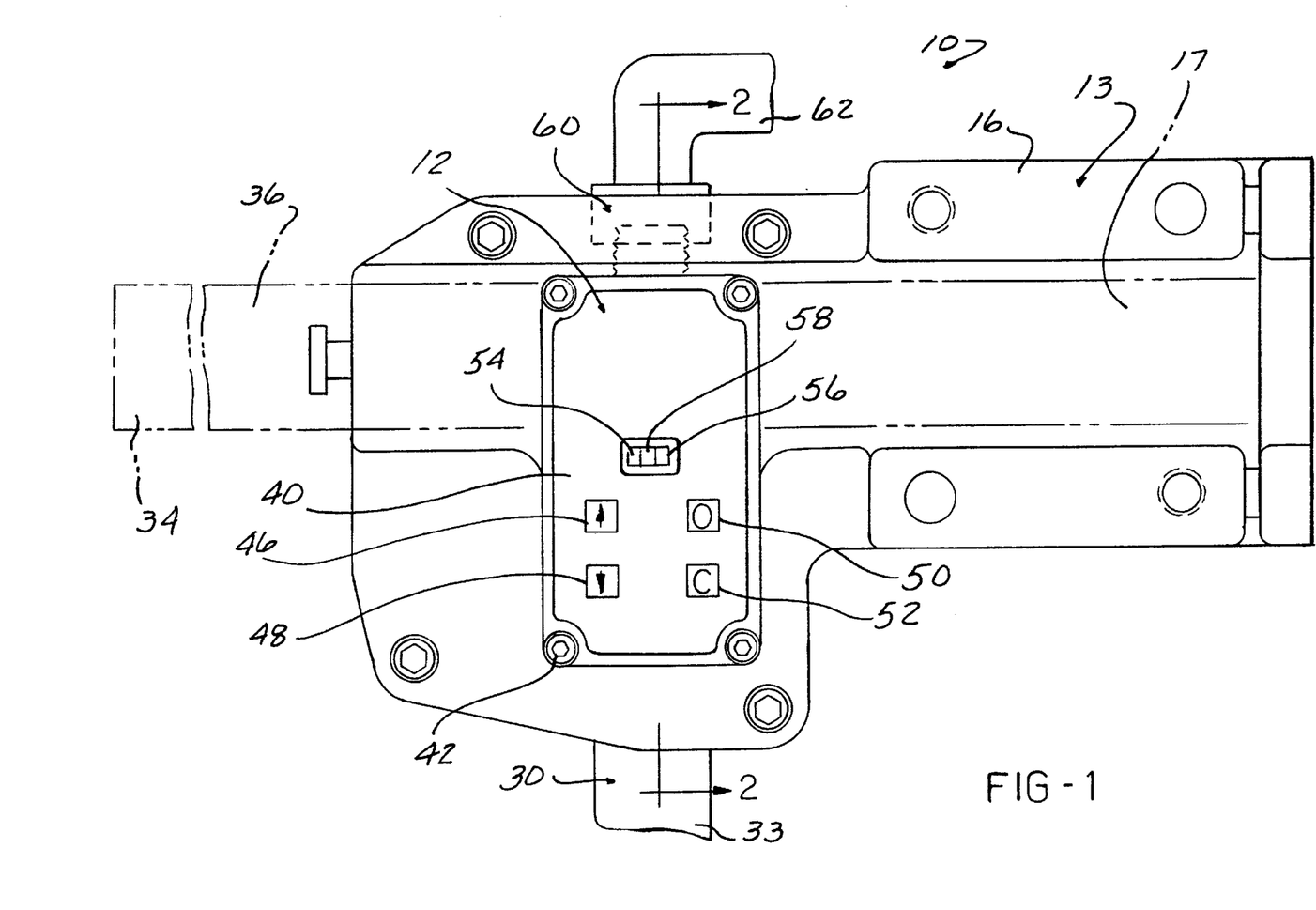
FIG. 1 is a side elevational view of a power-operated clamp having a clamp arm position detector of the present invention mounted thereon.
Figure 2:
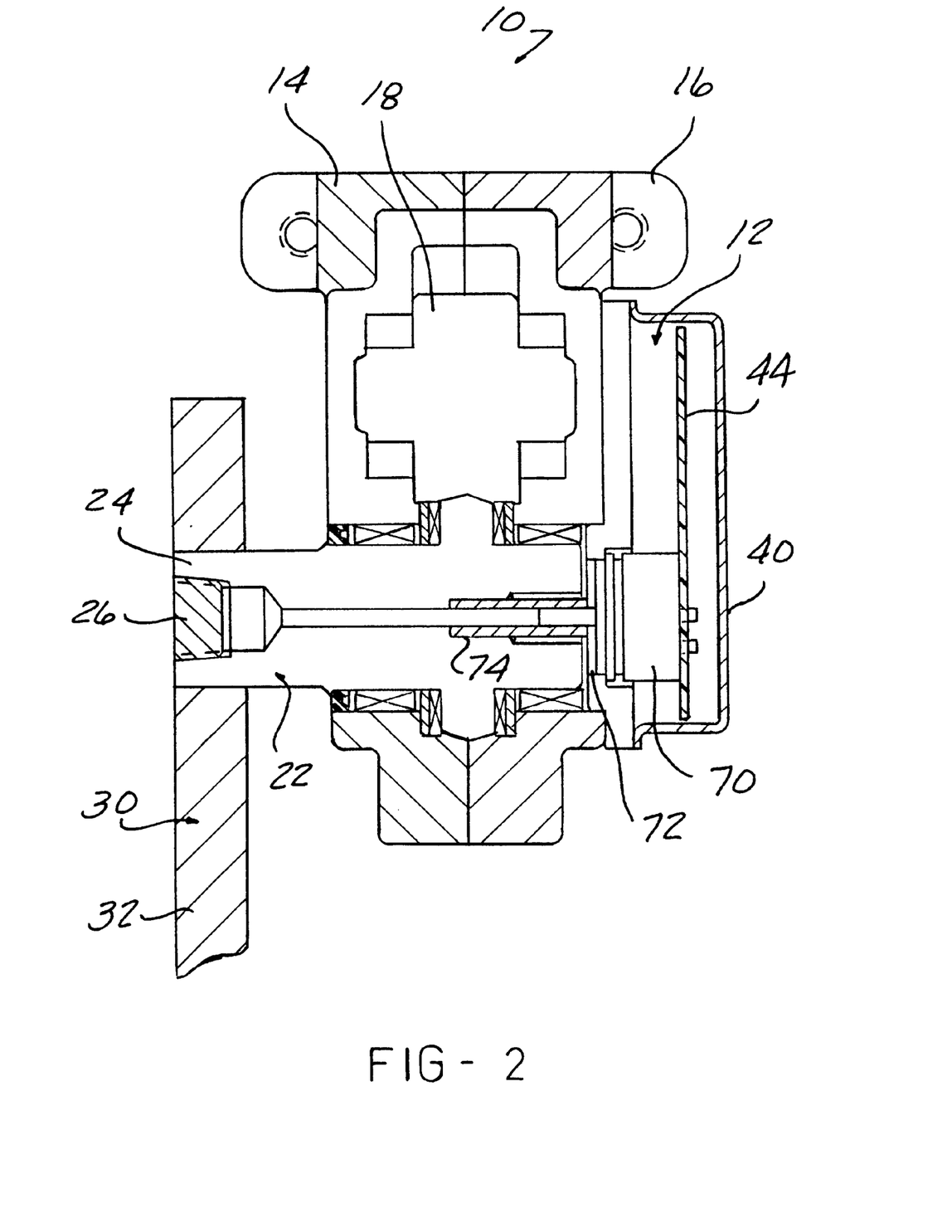
FIG. 2 is a cross-sectional view generally taken along 2—2 in FIG. 1.

Referring now to the drawing, and to FIGS. 1 and 2 in particular, there is depicted a typical fluid pressure actuated clamp 10 suitable for use with a clamp arm position detector apparatus 12 constructed in accordance with the teachings of the present invention. The clamp 10 includes a housing 13 formed of two joined housing members 14 and 16. One end of the clamp housing 13 is fixedly mounted to a external power source, such as fluid-pressure actuated cylinder, not shown. A piston rod extendibly mounted in the cylinder is connected to an extension rod 17 housed within the clamp housing 13. As described in greater detail in U.S. Pat. Nos. 4,021,027 and 5,074,652, the contents of which are incorporated herein by reference, the joined piston rod and extension rod 17 are coupled to a linkage 18 mounted within the clamp housing 13. One of the links of the linkage 18 is fixedly engaged with a shaft link 22 such that the linkage 18 converts linear movement of the cylinder rod and extension rod 17 into pivotal or rotational movement of the shaft link 22 fixed thereto.

One end of the shaft link 22 extends outward from the clamp housing part 14. A tapped bore 26 is formed in the outer end 24 and receives a fastener to secure a clamp arm 30 to the rotatable shaft link 22.

As shown in FIGS. 1 and 2, the clamp arm 30 has a first end 32 mounted on the rotatable shaft link 22. A second end 34 is opposed to the first end 32 of the clamp arm 30 and typically carries a workpiece engaging member, not shown.

In FIGS. 1 and 2, the clamp arm 30 is depicted by reference number 33 in a first normally closed position at which the second end 34 of the clamp arm 30 engages a workpiece, not shown. Retraction of the piston rod of the cylinder and the extension rod 17 causes rotation of the shaft link 22 in one direction thereby rotating the clamp arm 30 from the first position to a second position shown by reference number 36. In the second position, the second end 34 of the clamp arm 30 is spaced from a workpiece.

Extension of the piston rod of the cylinder and the extension rod 17 causes rotation of the shaft link 22 in an opposite direction thereby pivoting or rotating the clamp arm 30 from the second position to the first position.

The clamp arm position detector 12 of the present invention is mounted within a housing or cover to fixedly attach to the clamp housing portions 16. As shown in FIGS. 1 and 2, the cover 40 is secured by means of a plurality of fasteners 42 to the clamp housing portion 16. A printed circuit board 44 is mounted by means of standoffs, not shown, within the cover 40 and carries the operative components of the position detector 12.

As described in greater detail hereafter, a plurality of pushbuttons or switches 46, 48, 50 and 52 are mounted on or under the cover 40 and are connected to selected components on the printed circuit board 44. The pushbuttons 46 and 48 are respectively up and down angular position increments pushbuttons. The pushbuttons 50 and 52 are respectively associated with open and closed position movements of the clamp arm 30. Also mounted on the cover 40 and connected to components on the printed circuit board 44 are a plurality of lights, such as LEDs 54, 56 and 58. The first LED 54 provides an indication when the clamp arm 30 reaches a first preset as defined hereafter. The third LED 56 is illuminated when the clamp arm 30 reaches a second, different set point. The second LED 58 provides a "power on" indication.

A connector shown generally by reference number 60 is connected through the cover 40 to conductors extending from the printed circuit board 44. The connector 60 provides a separable connection with an external conductor or cable 62 which runs to an external controller, such as a programmable logic controller (PLC).

Figure 3:
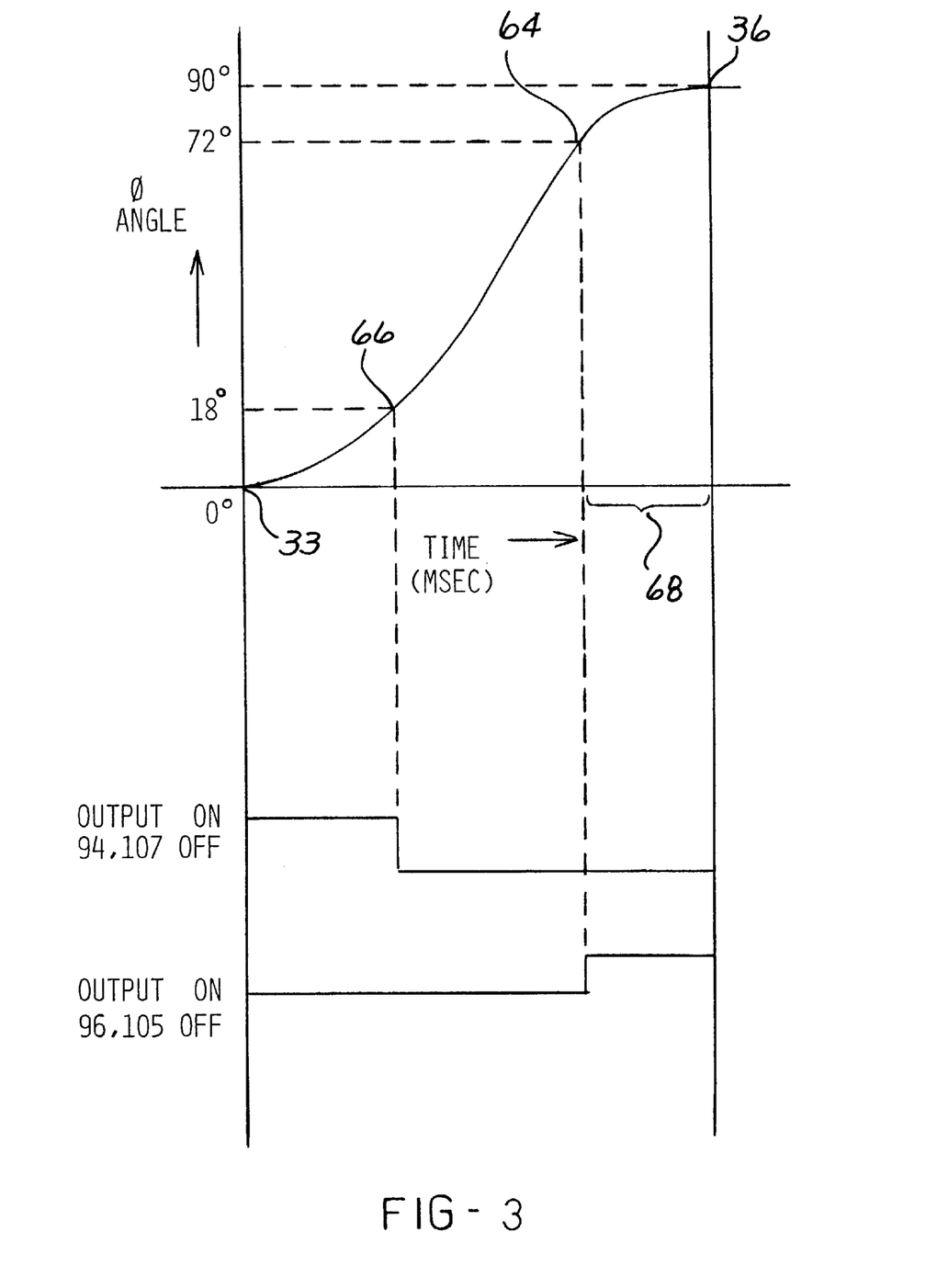
FIG. 3 is a graph depicting the functional operation of the clamp arm position detector of the present invention.

Referring briefly to FIG. 3, there is depicted a graph illustrating the typical operation of the clamp 10 as well as the function of the clamp arm position detector 12. In normal operation in which the clamp arm 30 moves from the fully closed position 33 to the second fully open position 36, the time versus pivot/rotation angle of the clamp arm 30 is shown by the solid line and generally follows an S-shaped curve. It is assumed, for example, that when the clamp arm 30 reaches the second fully open position denoted by reference number 36, the clamp arm 30 has moved through a 900 arc from the fully closed position 33. Movement of the clamp arm 30 from the fully open position 36 to the fully closed position 33 follows a reverse direction along the curve depicted in FIG. 3.

In order to increase production by initiating the next step in the assembly operation just prior to the clamp arm 30 reaching the second fully open position 36 or the first fully closed position 33, predetermined angular position set points may be established to initiate the next step or operation in the assembly process when the clamp arm 30, during its pivotal movement between the first and second positions 33 and 36 reaches, an angular position equivalent to one of the established set points. A first set point 64 is shown in FIG. 3 just prior to the clamp arm 30 reaching the second fully open position 36. By example only, the first set point 64 is set at 72° of angular rotation or movement of the clamp arm 30 from the first closed position 33. Obviously, other angular positions may be selected for the first set point 64 depending upon the requirements of a particular application. The position detector 12 of the present invention, in addition to enabling the programmable setting of the first set point 64 also provides an output signal 107 when the clamp arm 30 reaches and continues past the first set point 64 on movement of the clamp arm 30 from the first fully closed position 33 toward the second fully open position 36. This output signal 107 may be used by the external controller to initiate the next work operation.

As shown in FIG. 3, if it is assumed that it takes approximately one full second for the clamp arm 30 to move from the first fully closed position 33 to the second fully open position 36 or vice versa, the generation of the output 107 when the clamp arm 30 reaches the first set point 64 at 72° of travel provides an initiating signal to start the next work operation earlier in the overall clamp movement cycle time. By example, as shown in FIG. 3, the time savings denoted by reference number 68 resulting from the generation of the output signal 107 at the first set point 64, rather than when the clamp arm 30 reaches the second fully open position 36 equals approximately 200 msec.

A second set point 66 may be established just prior to the clamp arm 30 reaching the first fully closed position 33 on movement from the second fully open position 36. The second set point 66 at 18° is shown in FIG. 3 by way of example only as any angular increment may be selected for the second set point 66. An output signal 105 is generated when the clamp arm 30 reaches and passes beyond the second set point 66 to the first position 33 in the same manner as described above.

Although the first and second set points 64 and 66 are preferably set at angular positions different from the first and second end travel positions 33 and 36 of the clamp arm 30, it will be apparent that the set points 64 and 66 can also be set to the first and second end travel positions 33 and 36 of the clamp arm 30 to detect the fully closed 33 or the fully open 36 clamp arm positions.

The position detector 12 includes means for detecting or sensing the absolute position of the clamp arm 30. Any position sensor 70 may be employed in the present invention. By example only, the position sensor 70 comprises a rotary servopotentiometer or servoresistor which, when connected to a suitable voltage source, provides a variable output current through a variable resistance resulting by rotation of the movable portion 72 of the potentiometer 70. The movable portion 72 is fixedly connected to and rotatable with a shaft coupling 74 carried by the shaft link 22 as shown in FIG. 2. In this manner, bi-directional rotation of the shaft link 22 results in equal and simultaneous bi-directional rotation of the shaft coupling 74 and the movable part 72 of the potentiometer 70.

Referring now to FIGS. 1, 2, 3, 4 and 5, input power is received through the single conductor or cable 62 and the connector 60 shown in FIG. 1 to a rectification and high voltage power supply circuit 80. The circuit 80 provides DC rectification via a bridge 82 and is capable of accepting electrical power from 12V to 120V AC or DC. The output of the rectification and high voltage power supply circuit 80 is input to a voltage regulator 84 which provides low level DC power labeled VCC to the electronic components employed in the position detector 12.

Figure 4:
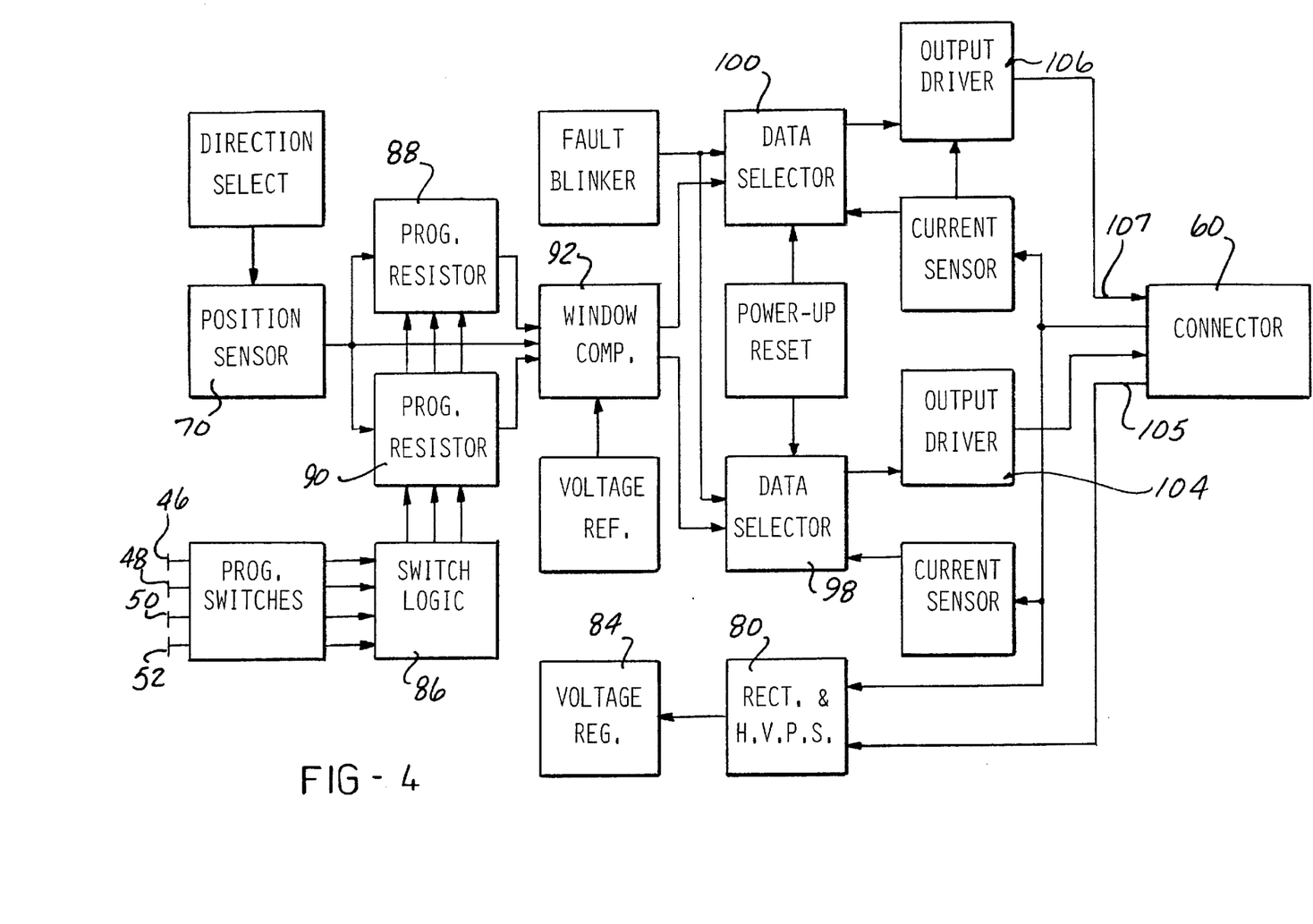
FIG. 4 is a block diagram of one embodiment of the clamp arm position detector of the present invention.
Figure 5:
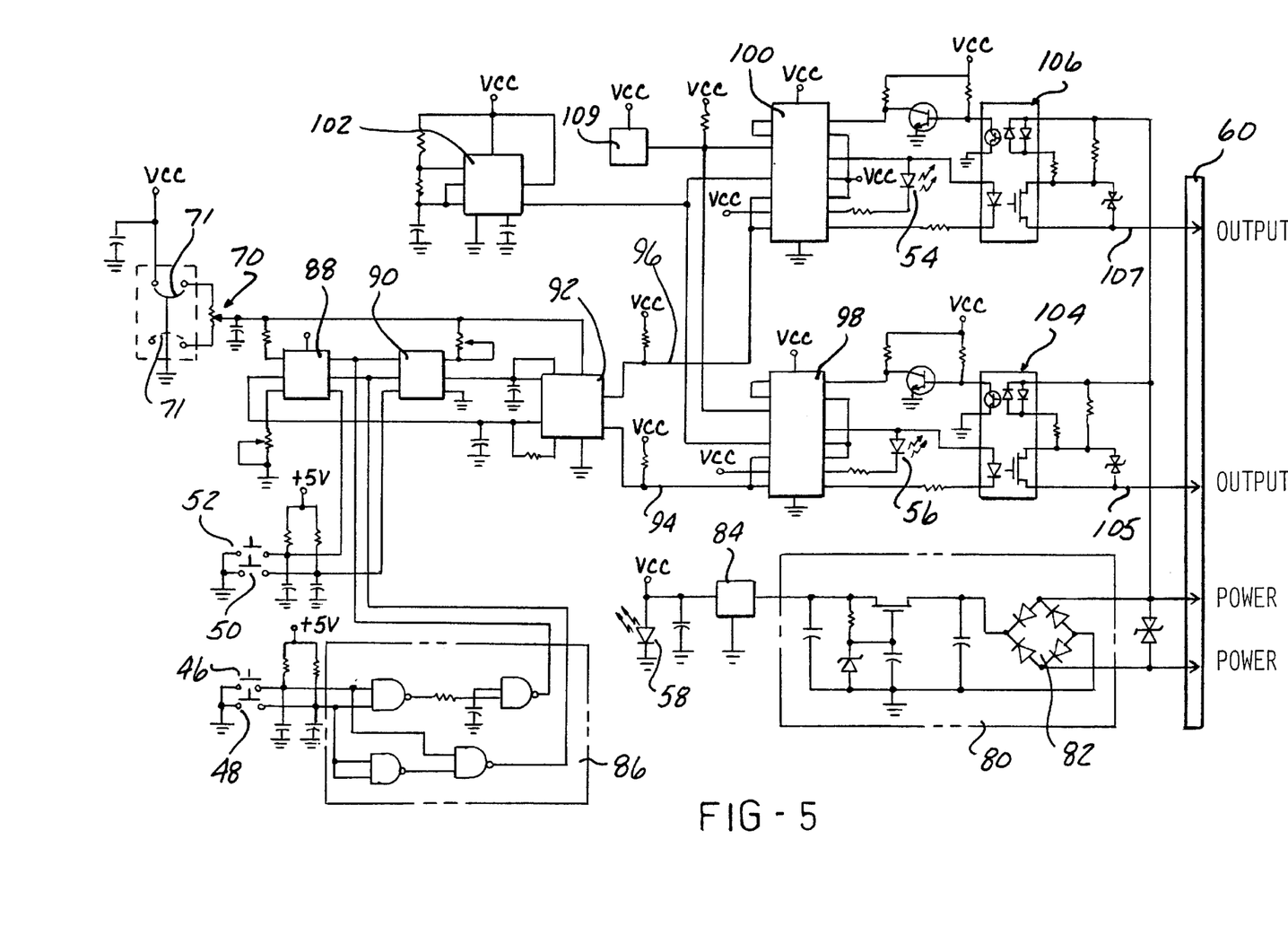
FIG. 5 is a detailed circuit diagram of the embodiment of the clamp arm position detector shown in FIG. 4.

The programming switches 46, 48, 50 and 52 are input through switch logic 86 to provide separate increment up, increment down, close and open signals to a pair of programmable resistor circuits 88 and 90. The programmable resistor circuits 88 and 90 are respectively provided for establishing the open and closed set points 64 and 66. The programmable resistor circuits 88 and 90, which may be $E_2POT$ nonvolative digital potentiometer circuits manufactured by Xicor, Inc. as chip no. X9312, generally comprise a resistor array of 99 series connected resistors, the junctions of which are connected to the source connection of one of a plurality of field effect-transistors. The gates of each transistor are connected to an electrically erasable programmable memory array. The drain connections of each transistor are connected in parallel to the movable portion or movable portion or wiper 72 of the potentiometer 70.

Inputs to the programmable memory array in each programmable resistor circuit 88 and 90 are received through the pushbuttons 46, 48, 50 and 52. To set the first set point 64, the open pushbutton 50 is held depressed and then either one of the increment up or increment down pushbuttons 46 and 48 is successively depressed a number of times to select a particular angular increment in degrees for the first set point 64. The same process is used with the close pushbutton 52 and either of the increment pushbuttons 46 and 48 to set the second set point 66. These values are stored in the memory array of each programmable resistor circuit 88 and 90 and select which transistor is activated thereby providing a variable voltage corresponding to the set points 64 and 66.

These voltages are output from the programmable resistor circuits 88 and 90 to a window comparator 92 which also receives the output of the movable portion 72 of the potentiometer 70. In this manner, the absolute angular position of the movable clamp arm 30 is detected by the potentiometer 70 and compared with the first and second angular position set points 64 and 66. Comparator output 94 changes state if the wiper 72 voltage is less than the voltage corresponding to the second set point 66. Comparator output changes state if the wiper voltage is greater than the voltage corresponding to the first set point 64 as shown in FIG. 3.

Due to left-hand and right-hand applications, a jumper 71 is used to change the ends of the potentiometer 70.

The outputs 94 and 96 from the comparator 92 are input to data selectors 98 and 100, respectively. The data selectors 98 and 100 select one of two inputs, namely a fault blinker input generated by a fault blinker circuit 102 or the respective one of the output signals 94 and 96 from the window comparator 92 indicative of the clamp arm 30 reaching one of the set points 64 and 66. The data selectors 98 and 100 select under input control, as described hereafter, one of the input signal from the fault blinker 102 or the outputs of the comparator 94 and 96 and pass the respective signal to one of two output drivers 104 and 106.

As shown in FIG. 5, the first and second LEDs 54 and 56 are connected to the outputs of the data selectors 100 and 98, respectively, to provide an indication when one of the first and second set points 64 and 66 is reached by the clamp arm 30.

The output of each data selector 98 and 100 is also connected to an opto-coupled driver circuit in the driver 104 and 106, respectively. The output of the data selector 98, when activated, energizes a light emitting diode which is opto-coupled to a field effect transistor to drive the transistor into conduction and thereby supply a signal 105 on the output line through the connector 60. A similar driver circuit is connected to the other data selector 100 and generates output 107.

The position detector 12 is also provided with a short circuit or overcurrent protection circuit. A back-to-back photodiode pair is connected in series with the output stage of each of the drivers 104 and 106 and conducts at a predetermined current provided by a pair of resistors. The photodiodes conduct at a predetermined current set for a short circuit external to the detector circuit. When conducting, the photodiodes drive a second transistor to provide an input to the data selector 98 or 100. This switches the data selector to select the output of the fault blinker 102 as an input in place of an output signal on line 94 or 96 from the window comparator 92. The output of the data selector 98 or 100 then drives the appropriate LED 54 or 56 to alternately flash the LED 54 or 56 at the flash rate of the fault blinker 102 to provide a short circuit indication externally of the position detector 12. At the same time, the output circuit with the fault is turned off.

A power up reset circuit 109, IC number MAX 810, holds the outputs of the data selectors 98 and 100 off when power is disconnected then reapplied to the position detect circuit to clear a fault.

Figure 6:
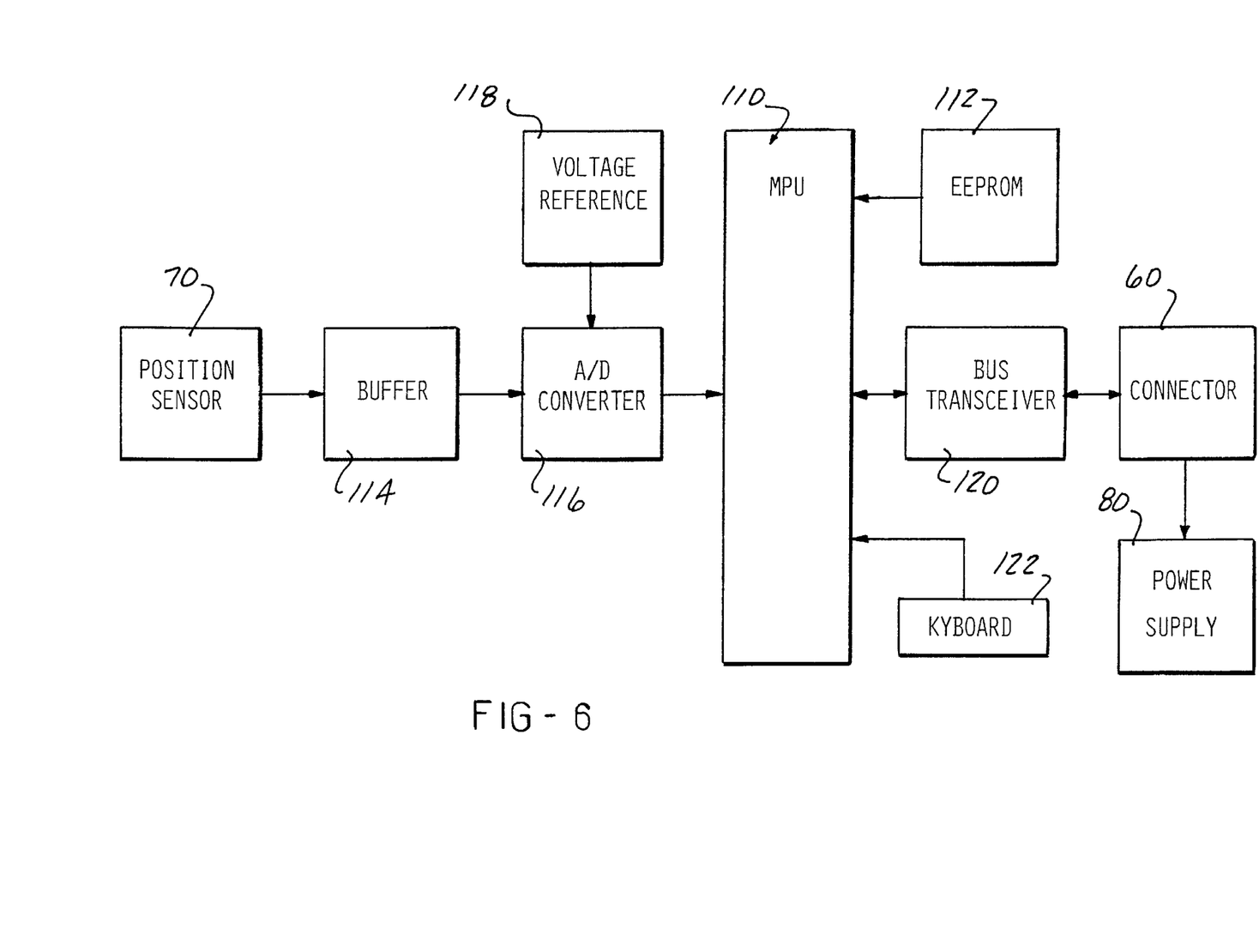
FIG. 6 is a block diagram of an alternate embodiment of the clamp arm position detector of the present invention.

FIG. 6 depicts an alternate embodiment of the position detector of the present invention. In this embodiment, a central processing unit or MPU 110, which may be any suitable microprocessor, etc., executes a control program stored in a memory. The processor or "MPU" 110 communicates with a memory 112, such as a EEPROM memory.

In this embodiment, the output of the position sensor 70 is input to a buffer circuit 114 and then to an analog to digital (A/D) converter 116 to provide a digital input to the MPU 110 representative of the absolute angular position of the clamp arm 30 as measured by the position sensor 70. A suitable voltage reference 118 is provided to the A/D converter 116.

The MPU 110 provides outputs to an optional bus transceiver 120 which provides bi-directional data communication between the MPU and an external network. The transceiver 120 is connected to the connector 60 to provide data communication between the MPU 110 and an external controller. A suitable power supply, such as the rectification and HVPS power supply 80 described above and shown in FIG. 4 may be provided through the connector 60 to the MPU 110 and the remainder of the position detector circuit shown in FIG. 6.

The operation of the embodiment shown in FIG. 6 is similar to that described above and shown in FIGS. 1–5. The position sensor 70 detects the absolute angular position of the clamp arm 30 at all positions of the clamp arm 30 between the first closed position 33 and the second open position 36. The position signal is input to the MPU 110 which compares them with the angular position presets 64 and 66 which are programmably setable in the MPU 110 from an external keyboard 122, keypad, etc., or communicated via the external network and stored in the memory 112. When the clamp arm 30 reaches one of the set points 64, 66, the MPU 110 provides an output through a bus transceiver 120 and connector 60 to an external network or external controller, not shown.

Figure 7:
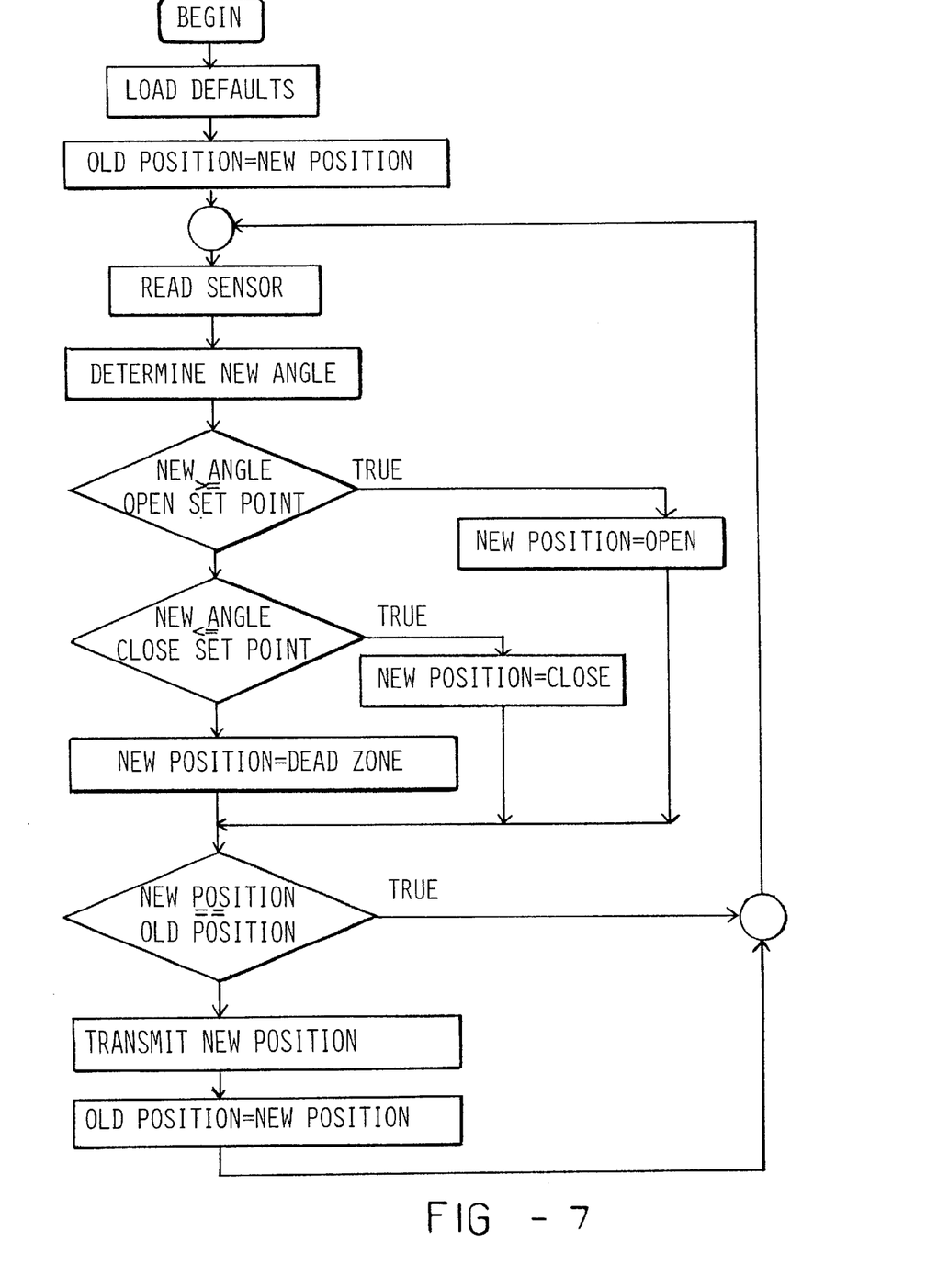
FIG. 7 is a flow diagram of the MPU operation.
Figure 9:
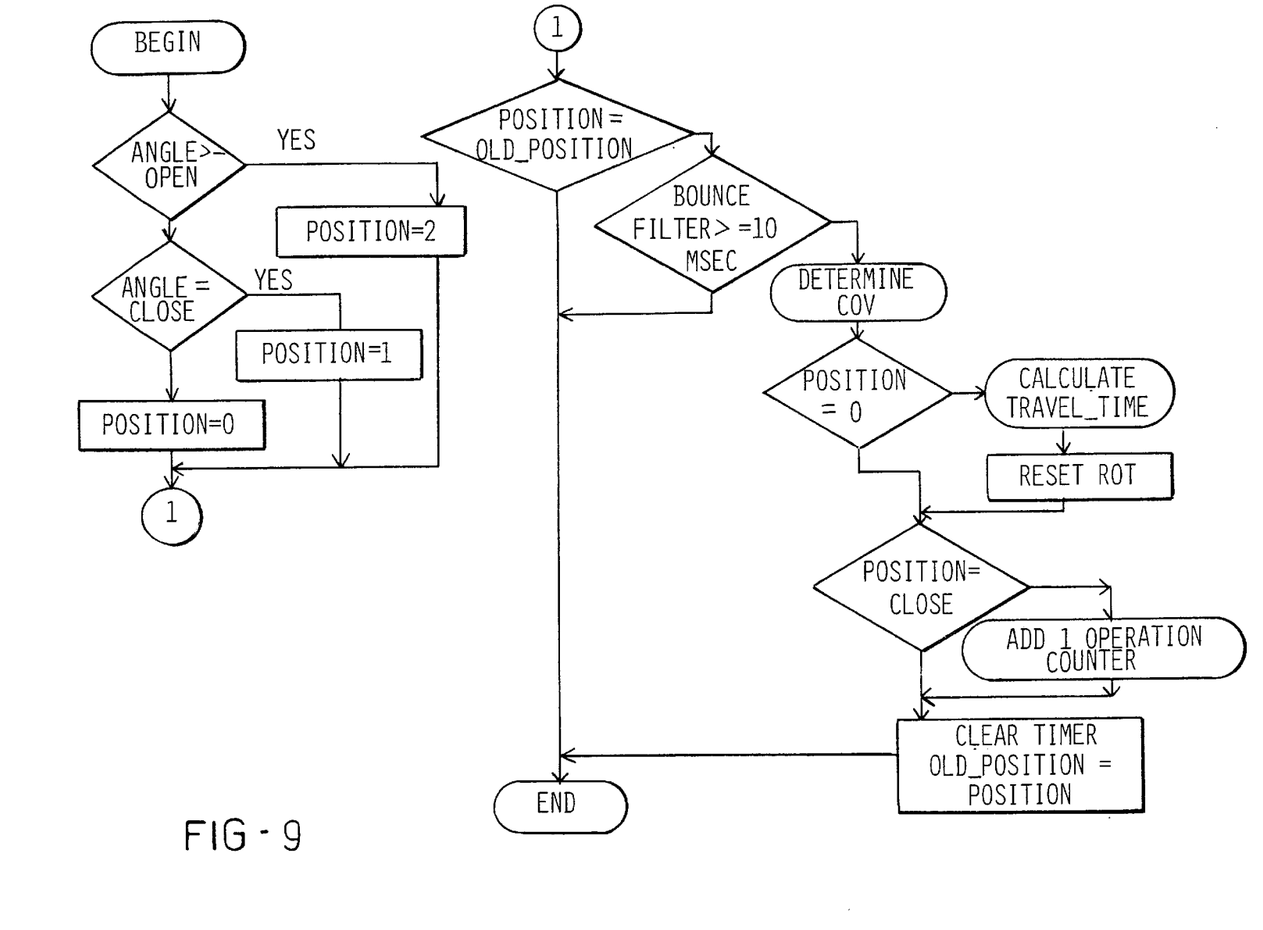
FIG. 9 is a flow diagram of the clamp arm position detection and travel time calculation sequence.

The MPU 110 executes a stored controlled program, shown functionally in FIGS. 7 and 9 to determine the open and closed positions of the clamp 30, the readout of existing first and second set points 64 and 66 or write of new first and second set points 64 and 66, and the generation of various error messages. The external network or controller may communicate with the MPU 110 in various ways, including a write or read command from the external controller at any time, a programmable timer enabling the MPU 110 to transmit output data at a fixed periodic time interval, or the MPU 110 can be programmed to transmit an unsolicited change-of-state message each time the MPU 110 senses a change in its input status.

By example only, the MPU 110 is programmed to provide two clamp defined error messages or flags, namely, minimum clamp travel time exceeded (MTE) and clamp flight speed warning (FSW). The minimum travel time is the clamp specified stroke time limit. If the travel time of pivotal movement of the clamp arm 30 between the first and second positions is less than the specified travel time, an error or warning will be generated.

The clamp travel time is calculated by:

$$(R \times 10)/(O-C) = K$$

$$(T \times K)/10 = \text{Travel Time}$$

where

T=5 msec counts from dead zone to open zone or from dead zone to close zone.

R=clamp total rotation in integer degrees.

O=open point in degrees

C=close point in degrees

A new constant is calculated whenever the open point, close point or angle of travel is changed.

Figure 8:
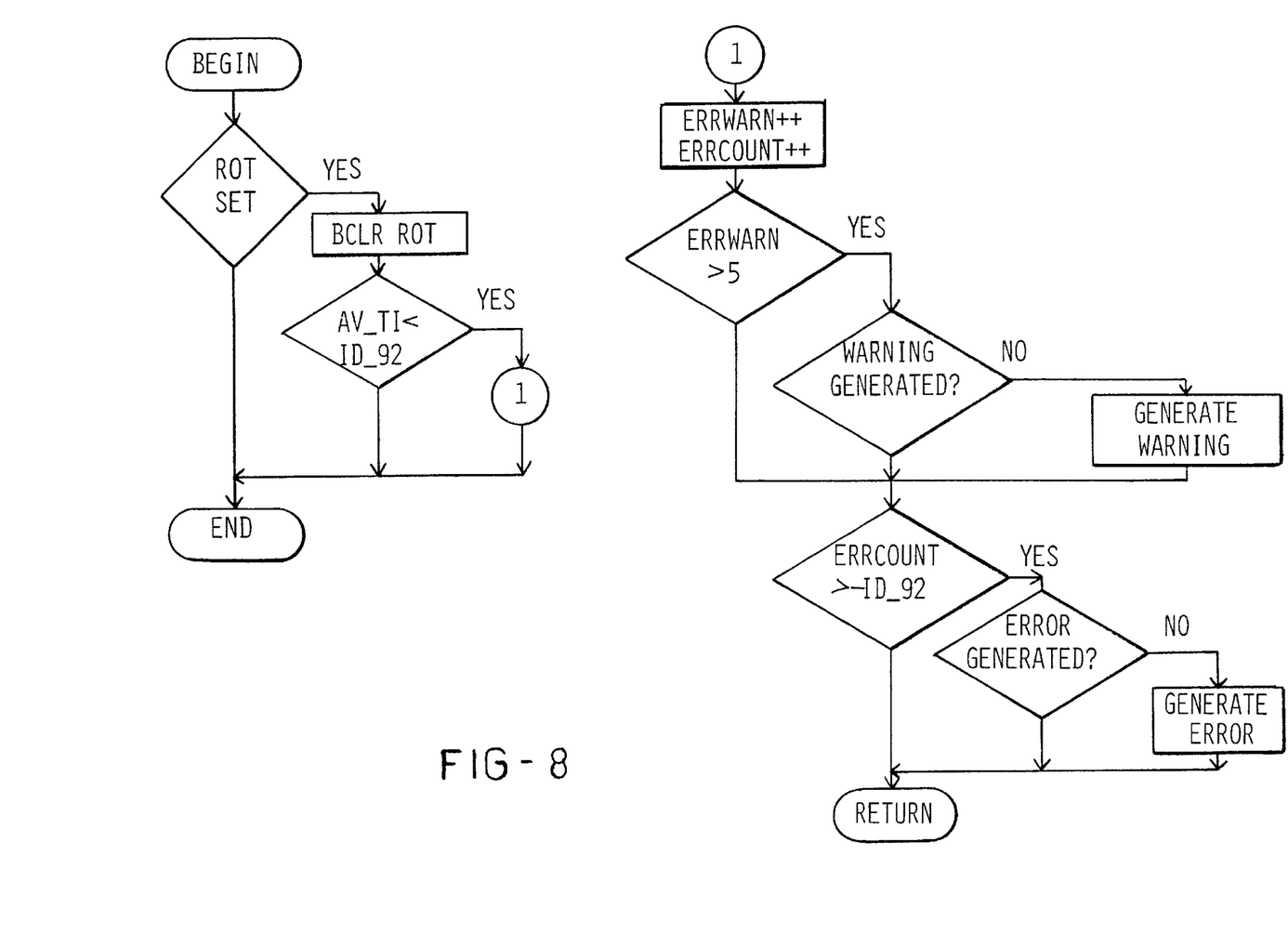
FIG. 8 is a flow diagram of the clamp travel time error/warning instruction sequence.

Each time that the minimum clamp stroke specification is not met, a counter is incremented. The MPU 110 can execute a read function to cause the counter output value to be transmitted to the external controller. This is shown in the flow diagram depicted in FIG. 8 wherein a error warning is generated after the fifth time that the minimum clamp stroke travel time specification has not been met.

FIG. 9 depicts a flow diagram of a control program sequence to determine the clamp arm position as well as the clamp stroke travel time.

The MPU 110 is also capable of activating or flashing the LEDs 54 and 56 depending upon the position of the clamp arm. The clamp arm 30 is considered to be in the open zone when the angle of rotation on the clamp arm is greater than or equal to the first set point 64. The clamp arm 30 is considered to be in the close zone when the angle of rotation of the clamp arm 30 is less than or equal to the second set point 66. The clamp arm 30 is considered to be in a dead zone when it is in neither of the open zone or the close zone. For example, the MPU 110 will deactivate both LEDs 54 and 56 when the clamp arm 30 is in the dead zone or the position detector apparatus is in a power-up mode. LED 54 will be illuminated when the clamp arm 30 is in the open zone. Conversely, LED 56 will be illuminated when the clamp arm 30 is in the close zone. Both LEDs 54 and 56 will flash when the clamp arm is in the dead zone and an error has been detected or generated. LED 56 will be activated and LED 54 flashing when the clamp arm is in the close zone and an error is detected. Oppositely, LED 54 will be constantly illuminated and LED 56 will be flashed when the clamp arm 30 is in the open zone and an error is detected.

In summary, there has been disclosed a unique clamp arm position detector apparatus which uniquely determines the absolute angular position of a rotatable or pivotal clamp arm. At least one and preferably two angular set points or positions are programmably set. A control circuit activates an output when the clamp arm reaches one of the angular set points thereby enabling an external controller to initiate subsequent work operations prior to the clamp arm reaching the full open or full closed positions.

What is claimed is:

1. A clamp arm position detector for a clamp having a pivotal clamp arm fixedly mounted on a rotatable shaft rotatable by an external power source between first and second end positions, the detector comprising:

means, coupled to a rotatable shaft on which a clamp arm is mounted, for detecting the absolute angular position of the clamp arm at all positions of the clamp arm between the first and second end positions.

2. The clamp arm position detector of claim 1 wherein:

the detecting means generates an output signal corresponding to the absolute angular position of the clamp arm.

3. The clamp arm position detector of claim 2 further comprising:

means for establishing a set point corresponding to one angular position between the first and second end positions of the clamp arm.

4. The clamp arm position detector of claim 3 wherein the set point is variable.

5. The clamp arm position detector of claim 3 further comprising:

means for changeably setting the set point.

6. The clamp arm position detector of claim 3 wherein:

the set point is setable in predetermined angular increments.

7. The clamp are position detector of claim 3 wherein:

the set point is setable in angular increments over a fixed angular range.

8. The clamp arm position detector of claim 3 wherein:
the set point is different from first and second end positions of the clamp arm.

9. The clamp arm position detector of claim 3 wherein the means for establishing the set point further comprises:
means for establishing first and second distinct set points, each corresponding to one distinct angular position of the clamp arm between the first and second end positions.

10. The clamp arm position detector of claim 9 wherein:
the first and second set points are each different from the first and second end positions of the clamp arm.

11. The clamp arm position detector of claim 9 wherein:
the first and second set points are setable in predetermined angular increments.

12. The clamp arm position detector of claim 11 wherein:
the first and second set points are setable in angular increments over a fixed angular range.

13. The clamp arm position detector of claim 9 further comprising:
the detecting means generating an output signal corresponding to the absolute angular position of the clamp arm; and
comparator means, responsive to the output signal from the detecting means and the means for establishing the first and second set points, for generating an output signal when the output signal from the detecting means corresponding to the absolute position of the clamp arm matches one of the first and second set points.

14. The clamp arm position detector of claim 1 wherein:
the clamp arm position detector is mounted on the clamp.

15. The clamp arm position detector of claim 1 further comprising:
a central processing unit executing a control program stored in memory;
the detecting means generating an output signal corresponding to the absolute angular position of the clamp arm, the output signal of the detecting means input to the central processing unit;
at least one set point stored in the memory, the at least one set point corresponding to one angular position of the clamp arm between the first and second positions;
the central processing unit including means for comparing the output signal from the detecting means with the at least one set point and generating an output when the output signal of the detecting means matches the set point.

16. The clamp arm position detector of claim 1 further comprising:
means, responsive to movement of the clamp arm between the first and second end positions, for measuring the travel time of the clamp arm between the first and second end position;
means for establishing a minimum travel time of the clamp arm between the first and second end positions; and
means for comparing the measured travel time with the established minimum travel time and for generating an error signal when the measured travel time is less than the established travel time.

17. A clamp arm position detector for a clamp having a pivotal clamp arm fixedly mounted on a rotatable shaft rotatable by an external power source between first and second end positions, the detector comprising:
means, coupled to a movable element of the clamp, for detecting the absolute angular position of the clamp arm at all positions of the clamp arm between the first and second end positions.

18. A clamp apparatus comprising:
a pivotal clamp arm fixedly mountable on a rotatable shaft rotatable by an external power source between first and second end positions;
means, responsive to movement of the clamp arm between the first and second end positions, for measuring the travel time of the clamp arm between the first and second end position;
means for establishing a minimum travel time of the clamp arm between the first and second end positions; and
means for comparing the measured travel time with the established minimum travel time and for generating an error signal when the measured travel time is less than the established travel time.

* * * * *